United States Patent
Naudet et al.

(10) Patent No.: US 7,500,644 B2
(45) Date of Patent: Mar. 10, 2009

(54) DEVICE FOR MAINTAINING AND POSITIONING HARNESSES ON A TURBO-JET ENGINE

(75) Inventors: Jacky Naudet, Bondoufle (FR); Aude Rivory, Paris (FR); Gael Gaignon, Viry Chatillon (FR)

(73) Assignee: Snecma, Paris (FR)

(*) Notice: Subject to any disclaimer, the term of this patent is extended or adjusted under 35 U.S.C. 154(b) by 0 days.

(21) Appl. No.: 10/875,202

(22) Filed: Jun. 25, 2004

(65) Prior Publication Data

US 2004/0266274 A1 Dec. 30, 2004

(30) Foreign Application Priority Data

Jun. 27, 2003 (FR) ................................. 03 07808

(51) Int. Cl.
*F16L 3/22* (2006.01)

(52) U.S. Cl. ...................... 248/68.1; 248/65; 248/49; 248/73; 248/226.11; 248/226.12; 248/309.1; 174/146; 174/68.1; 239/127.3

(58) Field of Classification Search ............... 248/68.1, 248/68 R, 65, 49, 89, 226.11, 226.12, 309.1, 248/205.1; 174/68.1, 70 R, 72 A, 72 R, 146; 239/127.3; 24/115 R, 339; 439/719
See application file for complete search history.

(56) References Cited

U.S. PATENT DOCUMENTS

| 2,542,442 | A |   | 2/1951 | Webber |
|---|---|---|---|---|
| 2,997,531 | A | * | 8/1961 | Oldham et al. ........ 174/158 R |
| 3,916,089 | A |   | 10/1975 | Sloan |
| 4,244,544 | A | * | 1/1981 | Kornat ................... 248/68.1 |
| 4,715,571 | A | * | 12/1987 | Soltow et al. ........... 248/68.1 |
| 5,351,888 | A | * | 10/1994 | Taylor et al. ........... 239/127.3 |
| 5,534,665 | A |   | 7/1996 | Long |
| 6,143,986 | A | * | 11/2000 | Anderson et al. ........ 174/72 A |
| 6,408,492 | B1 | * | 6/2002 | Sparks et al. ............. 24/336 |
| D508,842 | S | * | 8/2005 | Paolini .................... D8/395 |
| 6,943,319 | B2 | * | 9/2005 | Jones ..................... 219/213 |

FOREIGN PATENT DOCUMENTS

| DE | 39 16 510 | 12/1989 |
|---|---|---|
| FR | 591 314 | 7/1925 |
| GB | 796 532 | 6/1958 |
| WO | WO 00/79660 | 12/2000 |

* cited by examiner

*Primary Examiner*—J. Allen Shriver
*Assistant Examiner*—Todd M. Epps
(74) *Attorney, Agent, or Firm*—Oblon, Spivak, McClelland, Maier & Neustadt, P.C.

(57) ABSTRACT

A device for positioning and maintaining electric harnesses on the casing of a turbo-jet engine includes harness supports standardized for directions substantially perpendicular to the axis of the turbojet engine and harness supports standardized for directions substantially parallel to the axis of the turbo-jet engine.

19 Claims, 6 Drawing Sheets

DEVICE FOR MAINTAINING AND POSITIONING HARNESSES ON A TURBO-JET ENGINE

The present invention relates to a device for positioning and maintaining electric harnesses on the casing of a turbo-jet engine as well as an assembly method of harnesses on the casing.

Figure 1:
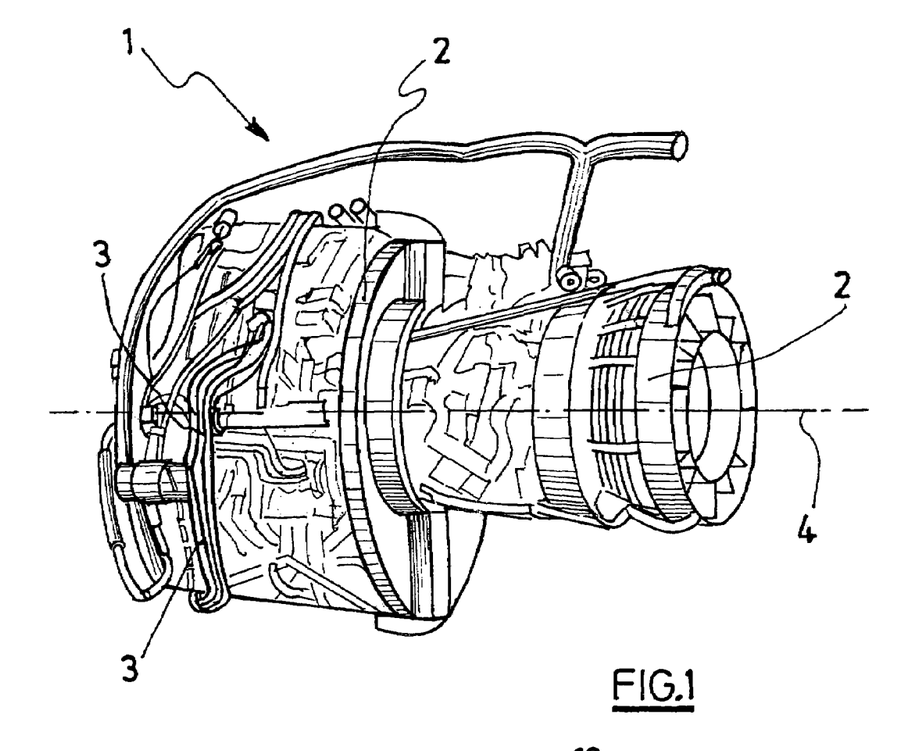
FIG. 1 is a perspective view of a turbo-jet engine.

With reference to FIG. 1, a turbo-jet engine 1 includes a casing 2, possibly composed of several parts according to its structure, which envelops the various components thereof, regardless whether they are rotational or not, such as for instance the blower, the compressor, the combustion chamber, the turbine, the nozzle and the post-combustion, as the case may be.

On the external surface of this casing 2, besides the fluid transport ducts, are laid out numerous electric cable assemblies, designated electric harnesses 3 in the field of turbo-jet engines. These electric harnesses supply in particular the various pieces of peripheral equipment of the turbo-jet engine 1.

The harnesses 3 are generally maintained on the casing 2 by sheet metal collars or plates, whereon they are snapped at regular intervals, in order to be maintained solidly. The collars and plates are fixed or welded to flanges or protrusions of the casing 2. The fastening points are defined on a case-to-case basis, relative to the harnesses 3 to be maintained or to the urgency of possible replacement. Besides, every harness element should be replaceable individually.

There results a non-standardized and hence very tedious assembly of all the harnesses 3, which is detrimental in terms of cost and of production cycle, but also of mass, because of the presence of numerous sheet metal parts.

The purpose of the invention is to remedy these shortcomings.

In this view, the present invention relates to a device for positioning and maintaining electric harnesses on the casing of a turbo-jet engine, the casing forming a peripheral envelop around the axis of the turbo-jet engine, characterized in that it comprises first harness supports standardized for directions substantially perpendicular to the axis of the turbo-jet engine and second harness supports standardized for directions substantially parallel to the axis of the turbo-jet engine.

Preferably, the first harness supports standardized for substantially perpendicular directions include lugs forming a body wherein housings are provided for maintaining harnesses.

Preferably still, the second harness supports standardized for substantially perpendicular directions include barrels with globally cylindrical body along which are provided housings for maintaining harnesses.

Advantageously, the barrels are fastened to a dummy duct mounted rigidly t the casing of the turbo-jet engine.

Other features and advantages of the invention will appear when reading the following description of the preferred embodiment of the device of the invention, with reference to the appended drawings, whereon:

With reference to FIG. 1, a turbo-jet engine 1 includes a casing 2 enveloping its various components. This casing 2 extends globally in a peripheral pattern around the axis 4 of the turbo-jet engine 1. Harnesses are laid out at the periphery of the casing 2. FIG. 1 represents a turbo-jet engine of the previous art, at the surface of which the harnesses 3 are arranged without any apparent order. The purpose of the device of the invention is to tidy up the arrangement of the harnesses 3.

Figure 2:
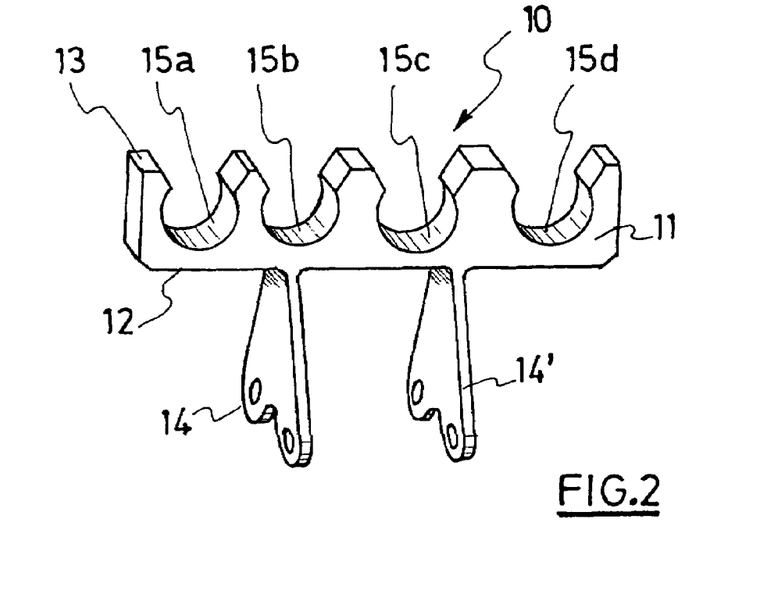
FIG. 2 is a front perspective view of a lug of the device of the invention.

The device of the invention includes lugs 10 one of which is represented on FIG. 2. The lug 10 includes a body 11, globally parallelepiped in shape, preferably of plastic material. On its lower face 12, the lug 10 includes two fastening tabs 14, 14'. In its upper portion 13 are provided housings 15a, 15b, 15c, 15d whereof the shape matches that of the harnesses 3. The housings 15a, 15b, 15c, 15d are formed by plastics technology moulding of the lug 10. Their shape may vary from lug to another, relative to the use which is made of the latter, the adaptation being made by ad hoc configuration of the plastics technology moulding.

Figure 3:
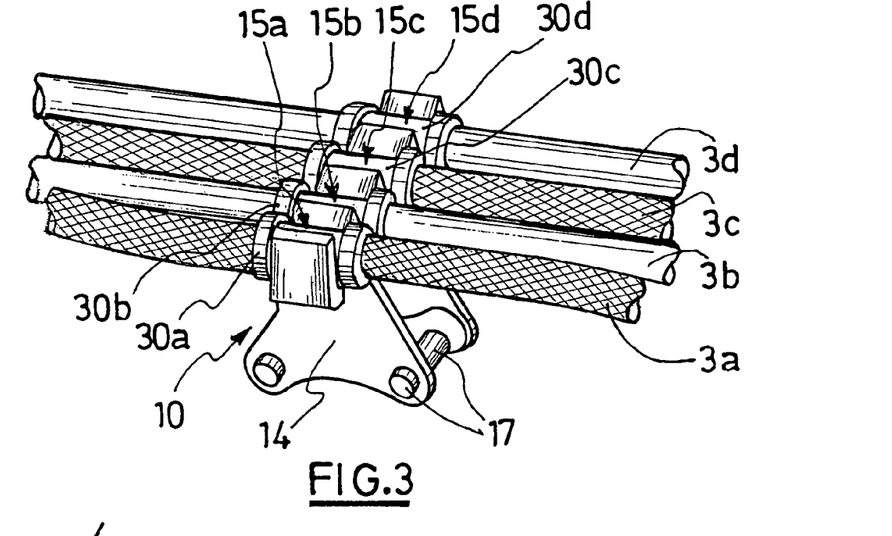
FIG. 3 is a side perspective view of a lug of the device of the invention, maintaining harnesses.

With reference to FIG. 3, the housings 15a, 15b, 15c, 15d are intended for receiving harnesses 3a, 3b, 3c, 3d, respectively. The harnesses 3a, 3b, 3c, 3d are in the form of cylindrical pipes made of insulating material wherein are inserted the conducting wires. More precisely, each harness, 3a, 3b, 3c and 3d, includes a ring forming a cylindrical bearing, 30a, 30b, 30c, 30d, respectively, inserted in the corresponding housing 15a, 15b, 15c, 15d, and whereof the diameter is adapted to that of the housing 15a, 15b, 15c, 15d supporting said bearing. Each ring 30a, 30b, 30c, 30d comprises at each of its ends a rim of diameter greater than that of the housing 15a, 15b, 15c, 15d wherein it is inserted, in order to prevent any movement of the harness 3a, 3b, 3c, 3d in longitudinal translation.

Figure 4:
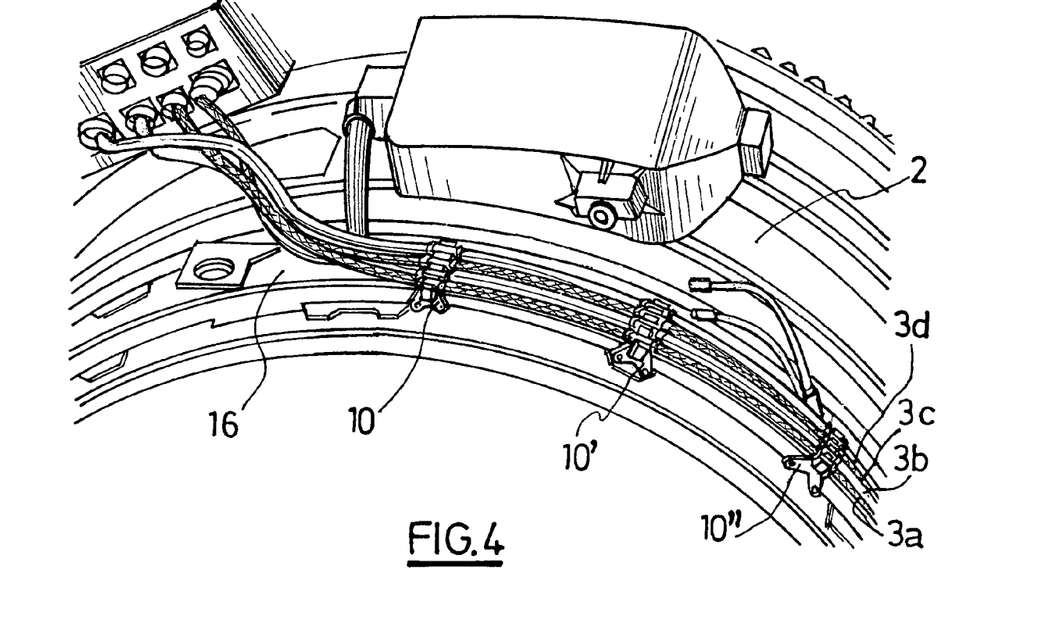
FIG. 4 is a schematic front perspective view of the casing of a turbo-jet engine whereon are attached lugs of the device of the invention.

FIG. 4 shows lugs 10', 10', 10" of the type of that described previously, attached to the casing 2 of the turbo-jet engine 1 in order to maintain the harnesses 3a, 3b, 3c, 3d in position. In the embodiment of the device of the invention described herein, the lugs 10, 10', 10" are intended for holding the harnesses 3a, 3b, 3c, 3d in the peripheral directions substantially perpendicular to the axis 4 of the turbo-jet engine 1.

The lugs 10, 10', 10" may be attached to the casing 2 in various ways. It is here chosen to attach them to circumferential flanges 16 of the casing 2, inasmuch as they are tangent to the peripheral directions perpendicular to the axis 4. Said flanges 16 may be of straight or T-shaped section, for example. A screw-nut system 17 ensures attachment of the tabs 14, wherewith the lugs 10, 10', 10" are fitted, to the flanges 16. Quick-release fastening means may also be used, for example of snap-on type, for easy and straightforward positioning and replacement of the lugs 10, 10', 10".

The harnesses 3a, 3b, 3c, 3d are not, a priori, all of identical diameter; the various housings of each lug 10, 10', 10" are sized accordingly, by appropriate sizing of the plastics technology moulds.

The lugs 10, 10', 10" are mounted on the casing 2 in relation to the arrangement of the harnesses 3a, 3b, 3c, 3d at the periphery of the casing 2, which may be pre-established. It is therefore possible to provide bundles of harnesses 3a, 3b, 3c, 3d laid out parallel to one another, for easier assembly in the production line, readability of their arrangement, but also easier replacement thereof. Moreover, it is possible to standardize the lugs 10, 10', 10" relative to the harnesses, themselves standardized, that they are supposed to support; in particular, such standardization could be performed for all the models of turbo-jet engine of the same manufacturer, possibly for models of turbo-jet engines of different manufacturers, enabling globalization of the definition of the arrangements of the harnesses on a turbo-jet engine.

The selection of the arrangement of the harnesses into bundles may only be made, generally, over the whole path travelled, on the periphery of the casing 2, by each harness in particular. Thus, the lugs 10, 10', 10" of the invention are used as much as possible along the paths shared by the harnesses of the same bundle, and when a particular harness must deviate from the circumferential 'route' provided, it is held on the casing 2 until its final attachment point using conventional holding means, made of sheet metal metal, for example.

Figure 5:
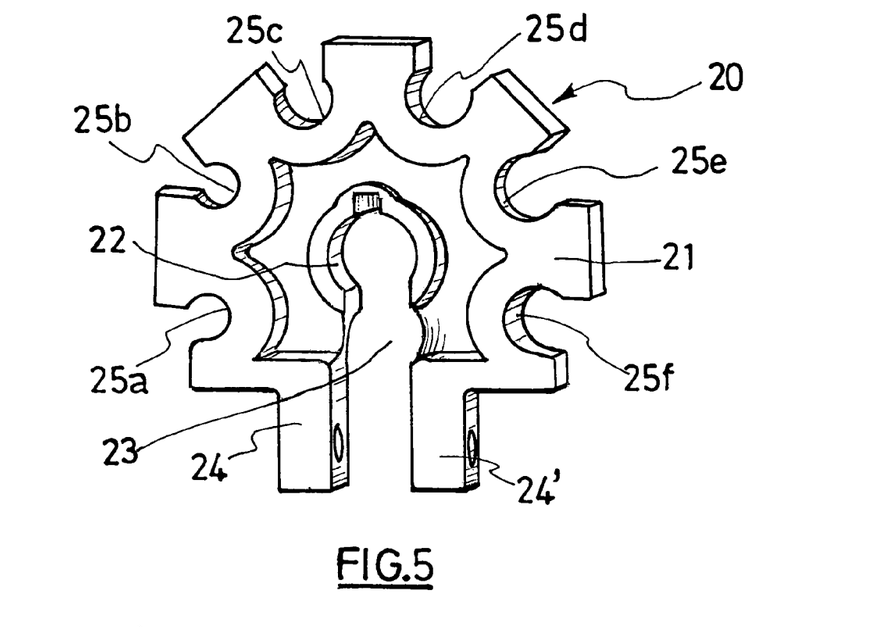
FIG. 5 is a schematic front perspective view of a first embodiment of a barrel of the device of the invention.

The device of the invention also comprises barrels, such as the barrel 20 represented on FIG. 5. The barrel 20 includes a body 21, globally cylindrical in shape, preferably of plastic material. The barrel 20 includes a central bore 22 with a radial recess 23 extending from its centre to its lower peripheral portion, and delineating at the latter two fastening tabs 24, 24'. On the remainder of its peripheral portion, the barrel comprises housings 25a, 25b, 25c, 25d, 25e, 25f with radial opening for the harnesses 3. The housings 25a, 25b, 25c, 25d, 25e, 25f are formed during plastics technology moulding of the barrel 20. Their shape may vary from one barrel to the other, in relation to the usage made thereof, any matching being made by ad hoc configuration of the plastics technology mould.

Figure 6:
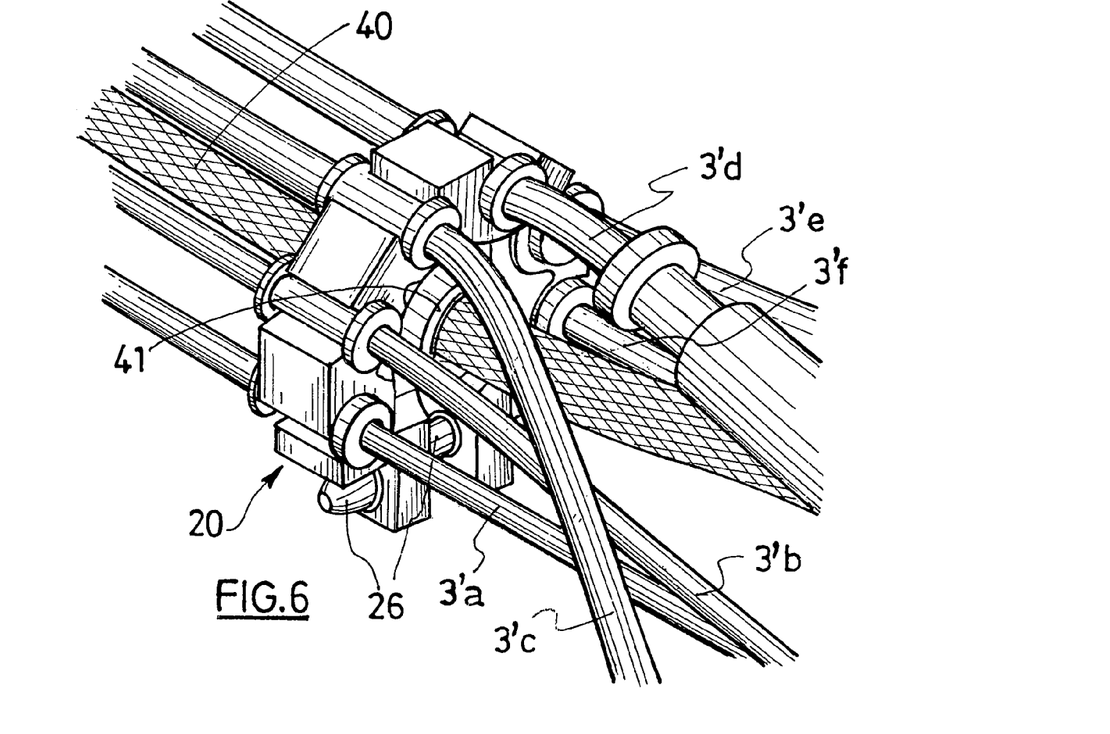
FIG. 6 is a side perspective view of FIG. 5, maintaining harnesses.

With reference to FIG. 6, the barrel 20 is attached to a dummy duct 40. Like the flanges 16 supporting the lugs 10, 10', 10" to the casing 2, the duct 40 maintains the barrel 20 fixedly with respect to the casing 2, with which it is integral. This duct 40, designated here as dummy inasmuch as it is not intended for guiding a fluid any way, forms hence the support of the barrel 20 on the casing 2. According to the arrangement chosen for the harnesses 3, the duct 40 may be chosen among the duct already existing and used for guiding fluids of the turbo-jet engine 1.

The barrel 20 is in this embodiment attached to the duct 40 by a screw/nut system 26 co-operating with the tabs 24, 24'. The duct 40 includes moreover a ring 41 co-operating with the bore 22. According to a variation, a quick-release fastening system is used. Regardless what it may be, the attachment system should ensure longitudinal and rotational translation maintenance of the barrel 20 on the duct 40.

Same as for the barrels 10, 10', 10", the housings 25a, 25b, 25c, 25d, 25e, 25f of the barrel 20 are intended for receiving harnesses 3'a, 3'b, 3'c, 3'd, 3'e, 3'f, respectively. As previously, each harness 3'a, 3'b, 3'c, 3'd, 3'e, 3'f includes a ring matched its housing 25a, 25b, 25c, 25d, 25e, 25f, as well as longitudinal maintenance rims.

The barrel 20 of FIG. 5 comprises six housings 25a, 25b, 25c, 25d, 25e, 25f. However, a smaller number of housing may be necessary, if a smaller number of harnesses 3 are intended for arrangement along the duct 40 whereon the barrel 20 is attached.

It is however preferable to have standardized type of plastics technology mould for the barrels, globally independent of the number of housings necessary, i.e. a mould which is globally cylindrical in shape, identical regardless of the number of housings provided.

The number of housings may be selected during moulding by arranging appropriate caches inside the plastics technology mould. The latter enables to obtain the maximum number of housings necessary, over all the paths followed by the harnesses at the periphery of the turbo-jet engine, with the option of removing some of them. This possibility is compulsory, since it is not acceptable to leave housings empty. Indeed, the technician operating on the turbo-jet engine must be sure that all the harnesses have been placed indeed, an empty housing indicating that, supposedly, a harness has been left aside.

Figure 7:
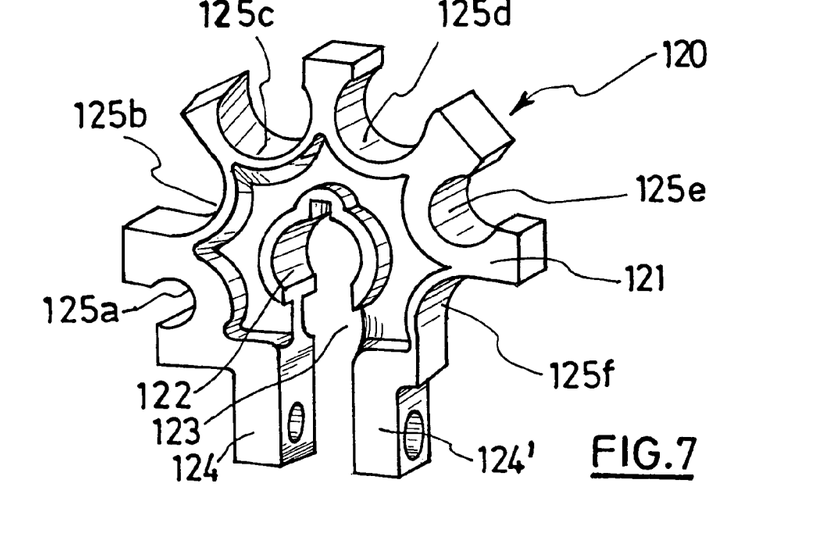
FIG. 7 is a schematic front perspective view of a second embodiment of a barrel of the device of the invention.

There is thus represented, on FIG. 7, a barrel 120, coming from the same plastics technology mould as the barrel 20 of FIG. 5, whereas the mould has been modified in order to give the housings a different configuration. Thus, the barrel 120 includes four housings 125a, 125c, 125d, 125e for harnesses, which are at the same angular position on the barrel 120 as the housings 25a, 25c, 25d, 25e of the barrel 20, but here with different diameters for some of them. Moreover, the sites 125b, 125f, corresponding to the sites of the housings 25b, 25f on the barrel 20, have been emptied. It is therefore possible to notice visually that they are not intended for supporting a harness.

It may also be contemplated that the sites not intended for supporting a harness are not emptied, but filled with matter.

It suffices to provide a mould whereof the core comprises removable or adjustable portions.

Figure 8:
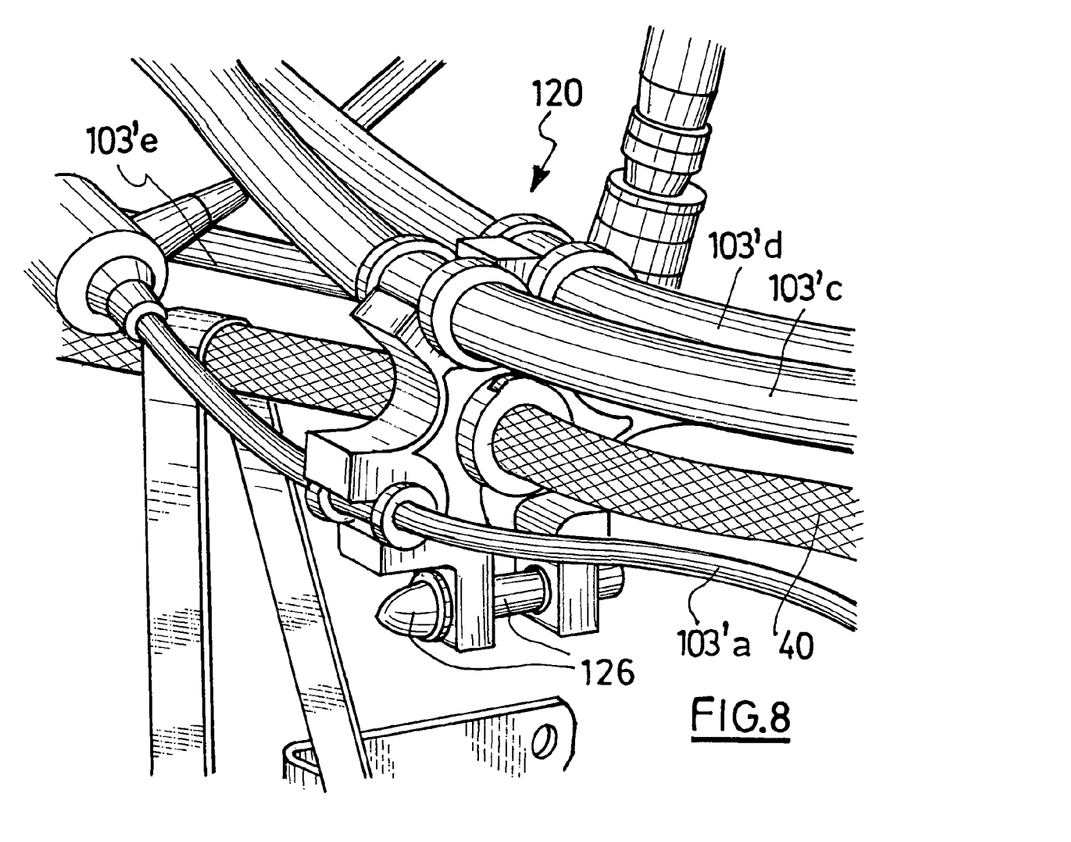
FIG. 8 is a side perspective view of FIG. 7, maintaining harnesses.

FIG. 8 shows a barrel 120 attached in the same way as the barrel 20 to the duct 40, here using a screw-nut system 126, which could be replaced by a quick-release fastening system. The housings 125a, 125c, 125d, 125e support harnesses 103'a, 103'c, 103'd, 103'e, by means of rings, in the same way as in the case of the barrel 20.

Figure 9:
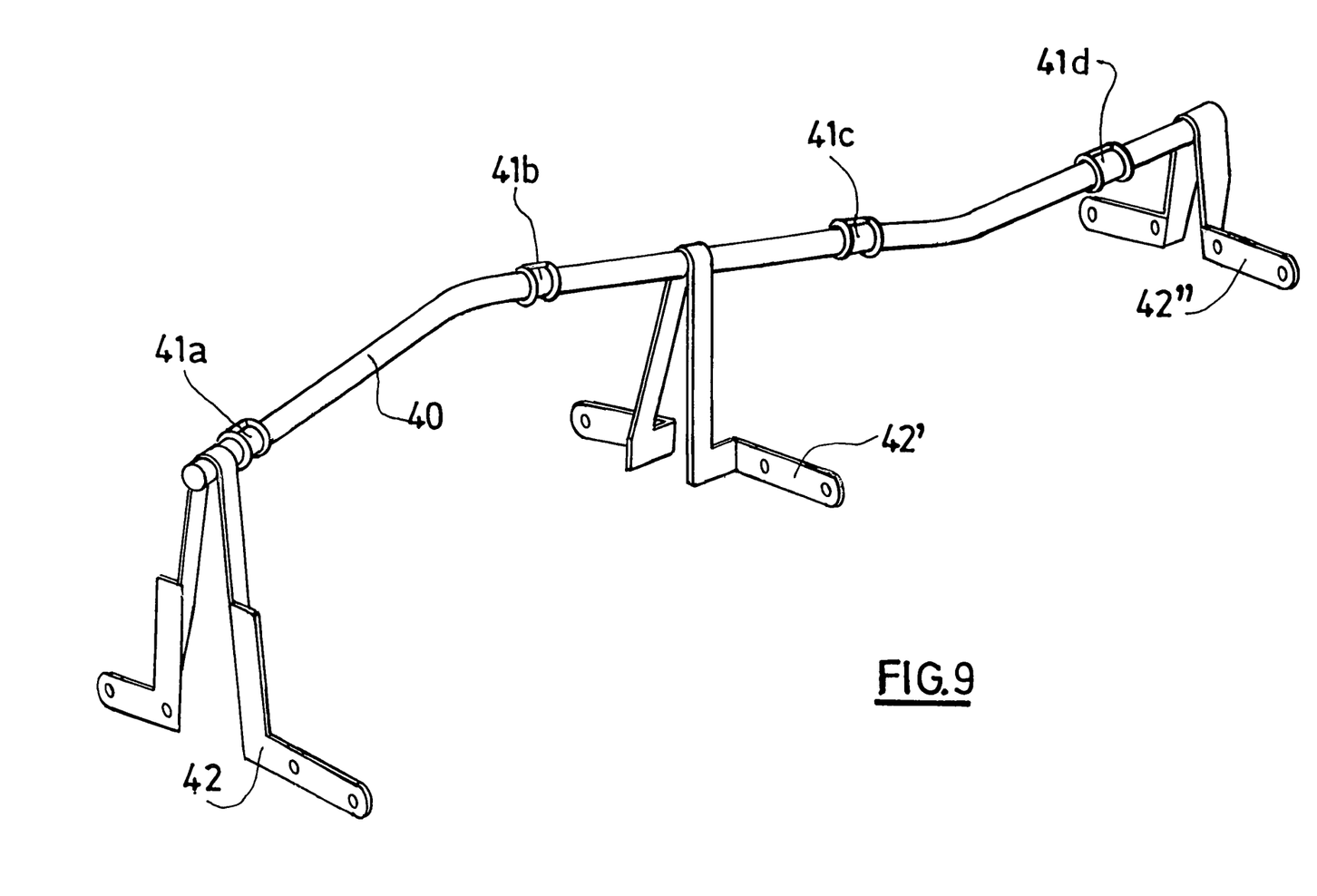
FIG. 9 is a side perspective view of a dummy duct of the device of the invention.

With reference to FIG. 9, the dummy duct 40 is attached to the casing 2 by means of fastening tabs 42, 42', 42". It supports rings or sleeves 41a, 41b, 41c, 41d spaced regularly over its length and intended to receive barrels of the type of those described above. On FIG. 9, the duct 40 is represented on its own, without any other element, but it corresponds to the duct 40 of FIG. 10, isolated from the other elements for easier understanding of its structure.

Figure 10:
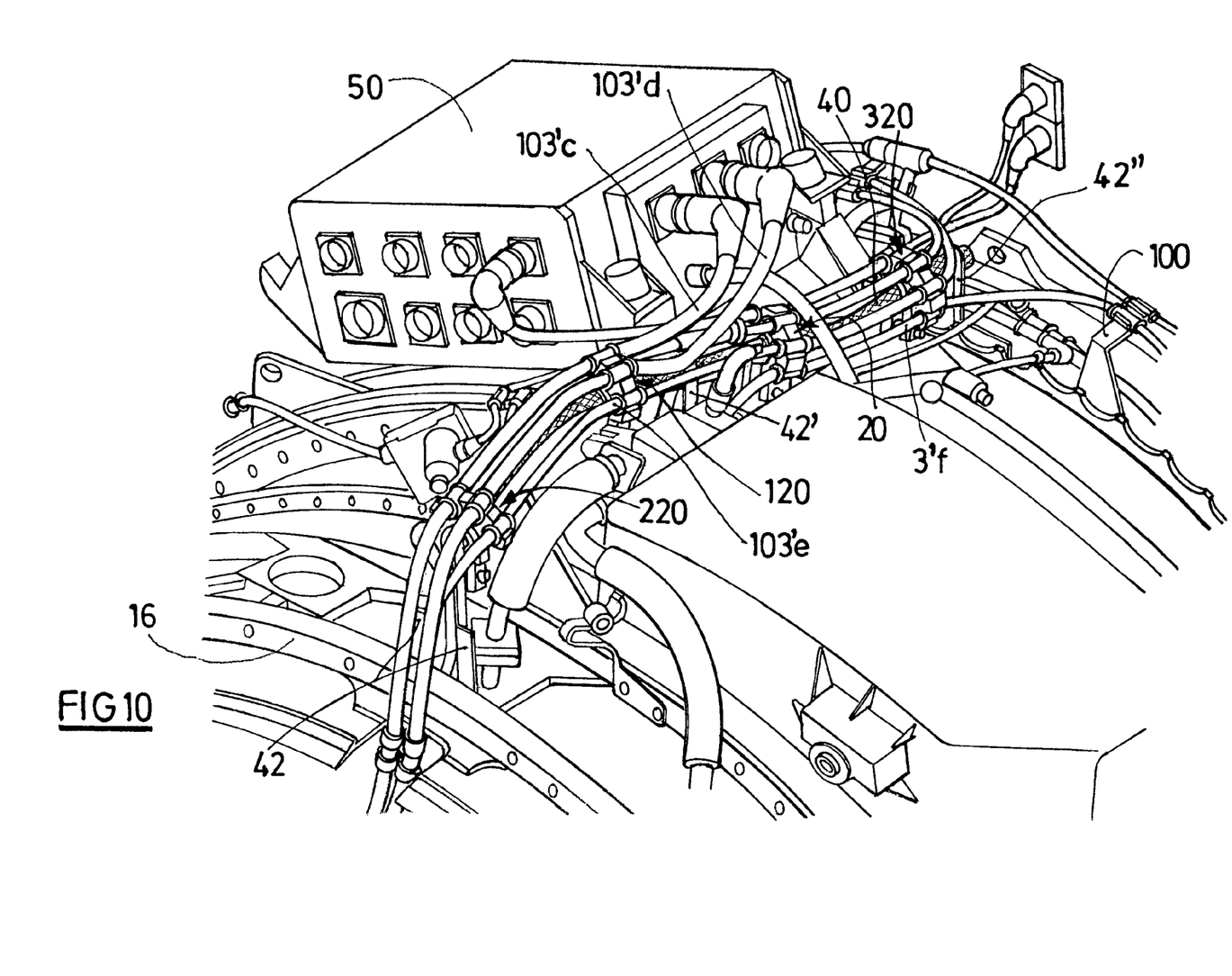
FIG. 10 is a perspective view of the casing of a turbo-jet engine whereon are attached the duct and the barrels of the device of the invention.

With reference to FIG. 10, the duct 40 of FIG. 9 is attached to the casing 2 by means of its fastening tabs 42, 42', 42". The rings 41b and 41c support the barrels 120 and 20, respectively. The rings 41a and 41d support two other barrels 220 and 320, shaped relative to the harnesses 3 to be supported at this location. In such a case, the barrels 220 and 320 comprise respectively five and six housings for harnesses.

The duct 40 and the barrels 20, 120, 220, 320, which it supports, form therefore a privileged path for the harnesses 3. In the embodiment of the device of the invention described here, the barrels are intended for maintaining the harnesses in the peripheral directions, substantially parallel to the axis 4 of the turbo-jet engine.

The arrangement of the harnesses 3 may be foreseen during the development stage of the engine, which enables to design the corresponding barrels 20, 120, 220, 320 and to place them on the duct 40. FIG. 10 is a good illustration of this approach. It has been notably mentioned above that the harnesses cannot follow, from the beginning to the end of their paths, pre-established runs along the ducts 40 or the flanges 16 and they do so over the longest possible distance before deviating them towards their destination, possibly supported by conventional supporting means. This situation is that of the harnesses 103'c and 103'*d*, which after having been supported by the barrel 220 and the barrel 120, deviate from the trajectory of the duct 40 in order to be connected to the equipment 50 for which they are intended.

FIG. 10 shows the presence of the flange 16 of FIG. 4, whereas the portion of casing 2 represented is substantially the same on both Figures. The lugs 10, 10', 10" and the harnesses 3*a*, 3*b*, 3*c*, 3*d* which they support, are however not represented for clarity purposes of the description of the barrels, but it is easy to imagine the whole device of the invention, i.e. the lugs on their flange and the barrels on their duct, by superimposing FIGS. 4 and 10.

The pre-established paths of the harnesses may involve, for the same harness, at the same time, on the one hand, portions of path running along the flanges, supported by lugs, on the other hand, portions of path along (dummy) ducts, supported by barrels. Such is the case for instance, of the harness 3'*f* of FIG. 6, which after a portion of path along the duct 40, supported by the barrels 20 and 320, changes direction to follow a trajectory perpendicular to the axis 4 of the turbo-jet engine, notably supported by a lug 100, of a type slightly different from the lug 10 of FIG. 2, but standardized in the same way.

It should be noted that, like the barrels, the lugs are modular as regards the number and the dimensions of the housings that they comprise. Thus, from a standardized model of lug, it is possible, by simple arrangement of appropriate caches in the core of the plastics technology mould, to remove or to add a housing, or to change the dimensions thereof. In particular, an unused housing site is either filled with matter or emptied explicitly, i.e. so that an observer may detect with certainty that no harness may be inserted into the recess.

The lugs and the barrels are derived from plastics technology. Consequently, it is very simple to adapt their structure and their composition to the usage made thereof, for example according to which ductile or rigid parts are required. It is notably possible that these parts are composed of several materials with different characteristics, comprise ductile slots or integrate embedded metal elements.

In the embodiment described of the device of the invention, lugs are used for maintaining harness in peripheral direction substantially perpendicular to the axis of the turbo-jet engine and barrels for the peripheral direction substantially parallel to the axis of the turbo-jet engine. The flanges extending at the circumference of the casing of the turbo-jet engine are used advantageously for supporting harness maintenance elements.

Any other type of harness maintenance element could be used. It is notably thinkable to adapt the geometry of the barrels to the flanges.

Thanks to the device of the invention and inasmuch as the extreme points of the harnesses are known, it is possible to define beforehand a simple configuration of the harnesses. Indeed, from one point to another, a trajectory may always be broken down, at least over its greatest part, into the sum of two (or more) peripheral trajectories, one which is substantially perpendicular and the other which is substantially parallel to the axis of the turbo-jet engine.

Thus, at the time of final installation of the engine, the assemblies composed of the harnesses and of their supporting elements may be installed more or less as a single block, at least in a standardized fashion, automatically and easily, and not, as is the case today, one part after the other.

Besides, the maintenance of the turbo-jet engine is vastly simplified. First of all, the arrangements of the harnesses are far more straightforward. Moreover, each supporting element may be mounted or dismantled individually. The same goes for the harnesses, let alone certain harness bundles, which thanks to the invention may be mounted or dismantled as a whole. Additionally, it goes without saying that, if the situation requires so, a conventional attachment means, such as a collar or a plate, may be added at any time.

The invention claimed is:

1. A turbo-jet engine, said turbo-jet engine comprising:
at least a casing, forming a peripheral envelop around a longitudinal axis of the turbo-jet engine,
a duct mounted on the casing of the turbo-jet engine,
electric harnesses laid out at the periphery of the casing, said electrical harnesses including at least a first electrical harness, a second electrical harness and a third electrical harness, each of said first, second and third electrical harnesses having a conducting wire inserted in an insulating material, and
a device for positioning and maintaining the electric harnesses on the casing of said turbo-jet engine, wherein the device comprises harness supports standardized for directions substantially perpendicular to the longitudinal axis of the turbo-jet engine and harness supports standardized for directions substantially parallel to the longitudinal axis of the turbo-jet engine,
wherein each of said harness supports standardized for directions substantially perpendicular to the longitudinal axis of the turbo-jet engine comprises a body defining a plurality of perpendicular housings that each extend substantially perpendicular to the longitudinal axis of said turbo-jet engine, said plurality of perpendicular housings including at least a first perpendicular housing, a second perpendicular housing and a third perpendicular housing, wherein said first electrical harness is received in said first perpendicular housing, said second electrical harness is received in said second perpendicular housing and said third electrical harness is received in said third perpendicular housing, wherein said first, second and third perpendicular housings extend within a same plane and are aligned with each other,
wherein each of said harness supports standardized for directions substantially parallel to the longitudinal axis of the turbo-jet engine comprises a cylindrical body defining a plurality of parallel housings that each extend substantially parallel to the longitudinal axis of the turbo-jet engine, each parallel housing being positioned at a periphery of said cylindrical body and around a central core of said cylindrical body, said plurality of parallel housings including at least a first parallel housing, a second parallel housing and a third parallel housing, wherein said first electrical harness is received in said first parallel housing, said second electrical harness is received in said second parallel housing and said third electrical harness is received in said third parallel housing such that said first, second and third electric harnesses are positioned around said central core,
wherein the cylindrical body includes a central bore that extends through said central core substantially parallel to the longitudinal axis of the turbo-jet engine, and
wherein at least one of said harness supports standardized for directions substantially parallel to the longitudinal axis of the turbo-jet engine is mounted on said duct at said central bore such that said duct passes through said central bore.

2. A device according to claim 1, wherein the body defining a plurality of perpendicular housings of at least one of the harness supports standardized for directions substantially perpendicular to the longitudinal axis of the turbo-jet engine includes at least one elongated lug that includes said plurality of perpendicular housings.

3. A device according to claim 2, wherein the lug is at least partially composed of plastic material.

4. A device according to claim 2, wherein the lug includes a means for attachment to a flange of the casing of the turbo-jet engine.

5. A device according to claim 1, wherein the cylindrical body defining a plurality of parallel housings of at least one of the harness supports standardized for directions substantially parallel to the axis of the engine comprises at least one cylindrical barrel that includes said plurality of parallel housings.

6. A device according to claim 5, wherein the barrel is at least partially composed of plastic material.

7. A device according to claim 5, wherein the at least one cylindrical barrel includes a means for attachment to the duct.

8. A device according to claim 7, wherein the duct includes at least one ring that supports the at least one barrel.

9. A device according to claim 7, wherein the duct is a dummy duct.

10. A device according to claim 5, wherein said central bore includes a radial recess extending from a center of said cylindrical body to a periphery of said cylindrical body.

11. A device according to claim 10, wherein said radial recess delineates two fastening tabs.

12. A device according to claim 11, wherein said cylindrical body defines said plurality of parallel housings at said periphery of said cylindrical body, each of said housings being configured to receive a harness.

13. A device according to claim 12, wherein at least two of said plurality of parallel housings are diametrically opposed to each other relative to said central bore.

14. A device according to claim 1, wherein the harness supports standardized for directions substantially perpendicular to the axis of the engine and the harness supports standardized for directions substantially parallel to the axis of the engine are attached by screw-nut systems.

15. A device according to claim 1, wherein the harness supports standardized for directions substantially perpendicular to the axis of the engine and the harness supports standardized for directions substantially parallel to the axis of the engine are attached by quick-release fastening systems.

16. A device according to claim 1, wherein at least two of said perpendicular housings defined in said body of said harness supports standardized for directions substantially perpendicular to the longitudinal axis of the turbo-jet engine have different sizes with respect to each other, and wherein at least two of said parallel housings defined in said body of said harness supports standardized for directions substantially parallel to the longitudinal axis of the turbo-jet engine have different sizes with respect to each other.

17. A device according to claim 1, wherein said first, second and third perpendicular housings are arrayed in a single row.

18. A device according to claim 1, wherein each parallel housing is positioned circumferentially around said central core of said cylindrical body, and said first, second and third electric harnesses are positioned circumferentially around said central core.

19. A device according to claim 1, wherein said at least one of said harness supports standardized for directions substantially parallel to the longitudinal axis of the turbo-jet engine is mounted on said duct such that said first, second, and third electric harnesses are positioned circumferentially around said duct.

* * * * *